United States Patent [19]
Lösch et al.

[11] Patent Number: 5,174,070
[45] Date of Patent: Dec. 29, 1992

[54] METHOD AND DEVICE FOR PREVENTING THERMAL DAMAGE OF WORKPIECES DURING GRINDING

[75] Inventors: Klaus Lösch; Werner Pickert, both of Coburg, Fed. Rep. of Germany

[73] Assignee: Kapp & Co. Werkzeugmaschinenfabrik, Coburg, Fed. Rep. of Germany

[21] Appl. No.: 751,148

[22] Filed: Aug. 28, 1991

[30] Foreign Application Priority Data

Jun. 17, 1991 [DE] Fed. Rep. of Germany ....... 4119871

[51] Int. Cl.$^5$ .............................................. B24B 49/00
[52] U.S. Cl. ................................. 51/165.76; 51/287; 51/322; 51/165.73
[58] Field of Search ........... 51/165.73, 165.74, 165.76, 51/287, 322, 326, DIG. 1

[56] References Cited

U.S. PATENT DOCUMENTS

| | | | |
|---|---|---|---|
| 2,326,368 | 8/1943 | Kullman et al. | 51/52 R |
| 3,986,305 | 10/1976 | Gunter | 51/287 |
| 4,565,474 | 1/1986 | Charles | 51/52 R |
| 5,044,127 | 9/1991 | Ryan | 51/52 R |

*Primary Examiner*—M. Rachuba
*Attorney, Agent, or Firm*—Robert W. Becker & Associates

[57] ABSTRACT

A method and a device for preventing thermal damage of workpieces during grinding are provided. According to the inventive method a two-flank rolling test is performed via a master pinion before the grinding process. The result of this two-flank rolling test is then used to calculate an effective maximum amount of material to be removed. Based on a permissible amount of material to be removed per time unit for the respective grinding tool a permissible rate of advancement of the grinding tool is calculated with the determined effective maximum amount of material to be removed. The calculated rate of advancement is then fed into the machine control unit. The device is provided with a master pinion for performing the two-flank rolling test, a rotatory measuring device connected to the master pinion for measuring rotatory deviations, and a translatory measuring device connected to the master pinion for measuring translatory deviations, whereby rotatory and translatory deviations are used to determine an effective maximum amount of material to be removed during grinding. Light-emitting diodes are visually indicating the respective maximum effective amounts to be removed may also be provided.

4 Claims, 1 Drawing Sheet

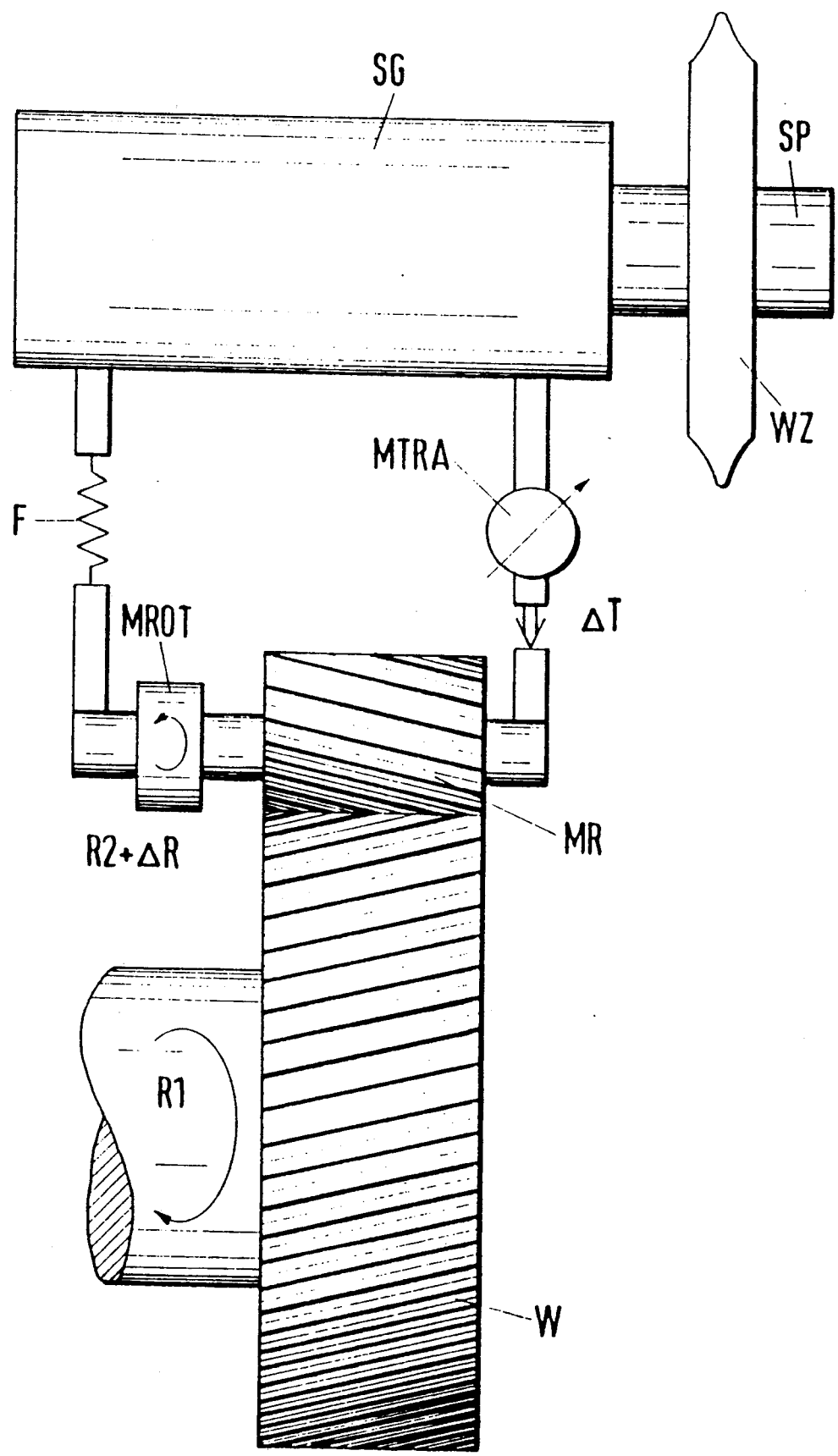

METHOD AND DEVICE FOR PREVENTING THERMAL DAMAGE OF WORKPIECES DURING GRINDING

BACKGROUND OF THE INVENTION

The present invention relates to a method and a device for preventing thermal damage of workpieces during grinding.

During the manufacture of high quality components such as toothed wheels and other workpieces with special profiles, it is of great importance, for providing high precision and trueness to form, after premanufacturing and after the hardening process to provide a further fine machining. As a further machining step grinding is commonly used. In this grinding step, a predetermined amount of material must be removed which corresponds to excess material resulting from premanufacturing before the hardening, to deformations caused by the hardening or to inaccurate positioning of the workpiece on the grinding machine. In the case of toothed wheels, the amount of material to be removed is usually within a range of 1/10 to 3/10 of a millimeter.

The final shape of the workpiece is achieved by grinding off the excess material whereby in some cases tolerances of only a few micrometers are allowable, especially with toothed components and other profiled workpieces in the aviation industry. On the other hand, due to economic and cost considerations, the fine machining should be performed in a short period of time in order to maximize the production rate per machine and per unit of time.

These two contrary requirements, on the one hand high precision and on the other hand removal of a substantial material excess within a short period of time have resulted in the development of highly efficient grinding processes, wherein, besides the conventionally employed grinding materials such as silicone carbide, electrocorundum etc., diamonds and cubic-crystalline boronitride (CBN) are also being used.

In the industrial practice, the fine machining process is carried out at high rates of volume of grit per time unit, that is, with a maximum number of removed cubic millimeter of material per second of grinding time and per millimeter of grinding disk width. Especially, when cubic-crystalline boronitride (CBN) is used high numerical values for the respective volume of grit per time unit may be achieved. Reference values for a maximum volume of grit per time unit and thus for the optimization of the grinding process with respect to economic considerations may be taken from common industrial practice.

The limit for the optimization of the respective process, however, is met where grinding is carried out under such high advancement and feeding rates that the grinding disk at the contact surface of the workpiece reaches locally high temperatures which result in thermally caused structural changes of the workpiece surface layers. Such a thermal damage to the workpieces will result in a high discard rate.

For the industrial production of toothed wheels it is therefore important to provide a stable grinding process that will not cause thermal damage. In practice, in the manufacture of toothed wheels, especially in man production, it has been shown that there are no finishing process which at a high economic efficiency will ensure that no thermal damage occurs. It is therefore common monitoring practice to use so-called nital etching processes wherein workpieces removed at random from the production line are etched in different baths in order to make visible structural changes of the surface portions of the workpiece. However, this process is relatively expensive and time consuming and does not provide a sufficiently reliable screening of the machined workpieces. These etching processes are also very costly and time-consuming. Furthermore, these processes are only usable in a subsequent testing in order to separate damaged pieces from quality pieces. At the time of the testing the finishing process has already taken place and the damage finished workpieces to be discarded. Today's practice is thus damage recognition but not damage prevention.

Tests have shown that thermal damage occurs when during the grinding process the amount of material to be removed per time unit has been set to an excessive value. Then, per second of grinding time and per millimeter of grinding disk width too many cubic millimeters of material are removed. The respective value of the amount of material per time unit may also be calculated by multiplying the area to be subjected to grinding with the advance of the grinding tool relative to the workpiece.

Today there are highly efficient grinding tools available on the market with which it is possible to achieve a defined value for the respective amount of material to be removed per time unit for a given time period without creating thermal damage. According to the aforementioned definition of the respective amount of material per time unit, two parameters determine a flawless finishing process without thermal damage: on the one hand, the rate of advancement of the grinding tool and, on the other hand, the effective amount of material to be removed which depends on the premachining of the tool, on deformations during the hardening process and/or the positioning of the tool during grinding. These conditions are at least valid for full-form grinding processes in which with one or with only a few grinding steps the entire amount of material is removed. This grinding process is commonly used in the mass production of toothed wheels nowadays. In principal, these conditions hold true for any kind of hard fine machining respectively finishing.

In practice, it has been proven that an economical and technically flawless grinding process may be achieved when workpieces are machined with high quality tools and optimized rates of advancement within the grinding machine while the amount of material to be removed will be kept within a given tolerance value. The problems concerning thermal damage however, may occur when unpredictably great increases of the amount of material to be removed occur so that the grinding tool is extensively loaded. These deviations of the amount of material to be removed may occur when a different lot of tools is to be ground in which the manufacturing has been inexact and/or increased deformations due to the hardening process have occurred.

It is therefore an object of the present invention to provide a method to prevent thermal damage of workpieces, i.e. thermal loads of a workpiece during grinding. The method should be simple and, in critical cases, should provide for a change of the grinding step conditions before the grinding step occurs so that high quality workpieces may be manufactured without discard.

BRIEF DESCRIPTION OF THE DRAWINGS

This object, and other objects and advantages of the present invention, will appear more clearly from the following specification in conjunction with the drawing which shows the front view of a workpiece in the form of a helical spur gear that is machined with a grinding tool which is mounted on a grinding spindle supported at a housing.

SUMMARY OF THE INVENTION

The method of the present invention for preventing thermal damage of workpieces during grinding is primarily characterized by the following steps: before grinding, performing a two-flank rolling test with a master pinion; calculating an effective maximum amount of material to be removed during grinding from results obtained during the two-flank rolling test; determining a permissible rate for advancing a grinding tool, based on a respective permissible volume of material to be removed per time unit and the effective maximum amount of material to be removed; and feeding the permissible rate for advancing the grinding tool to a grinding machine control unit.

The optionally automized two-flank rolling test of the unground toothed wheel performed on the grinding machine with the aid of a master pinion provides all the necessary information when registering the axis distance changes and the angle of rotation deviations to determine the effective maximum amount of material to be removed. This effective maximum amount of material to be removed includes deviation of trueness, the deviations due to premanufacturing, deviations of the trueness of the plane and misalignments of the tool. The division of the so determined effective maximum amount of material to be removed by the permissible amount of material to be removed per time unit renders the desired rate of advancement with which the workpiece may be machined without the danger of causing thermal damage.

When this method is employed during grinding in a multiple clamping unit (a plurality of identical toothed wheels is disposed adjacent to one another on a hydraulic mandrel), the two-flank rolling test must be performed for each individual toothed wheel. The determining factor is then the greatest valve of all the determined effective maximum amounts of material to be removed under consideration of angular misalignments between the individual toothed wheels.

Especially in mass production of toothed wheels the grinding process is commonly divided into multiple steps in order to increase the efficiency. The amount of material to be removed is for example removed in two partial working steps. The first step, the so called roughing, represents a pregrinding operation and removes approximately ⅔ of the amount of material to removed. The second step, the so-called finish-machining, provides the final shape and removes the last third of the amount of material to be removed. Different grinding tools are used for the roughening and the finish-machining step. The roughing grinding disk is provided with grinding particles of a greater particle diameter and may achieve greater values for the amount of material per time unit then a grinding means with a smaller particle diameter. A grinding disk having particles of a smaller diameter is used for the finish-machining step whereby due to the reduced amount of material per time unit a greater surface quality may be achieved.

For such a divided grinding process the respective roughing and finish-machining tools must be adjusted to one another in order to be able to reach the full efficiency of this finishing process. Due to wear at the roughing tool it may be possible that the amount removed during the roughing step is too small and the remaining amount for the finish-machining is too great. This will result in an increased load of the finish-machining tool and thus possibly in thermal damage.

This problem may be solved by a further embodiment of the present invention. In a preferred method of the present invention the two-flank rolling test is performed after the roughing step and before the finish-machining step, whereby in the calculating step a respective effective maximum amount to be removed during the finish-machining step is calculated and, if the respective effective maximum amount to be removed exceeds a preset limit, the rate for advancing the grinding tool is reduced. According to this method, at certain time intervals, for example, after 100 workpieces have been machined, the two-flanked rolling test is performed with the aid of the master pinion. The analysis of this test makes it possible to determine the effective maximum amount of material to be removed during the finish-machining step and then, if necessary, to reduce the rate of advancement so that no thermal damage will occur.

In general, the method of the present invention is not only suitable for the aforementioned helical spur gear but also for workpieces having any other kind of profile. Accordingly, the master pinion used for the two-flank rolling test must be provided with the respective counter profile.

The present invention also relates to a device for preventing thermal damage of workpieces, especially of toothed wheels, during grinding by performing a two-flank rolling test, analyzing the measured data and feeding the resulting data into the machine control unit.

According to a further embodiment of the invention the progress of the grinding process may be visually transmitted to the operating personnel in a simple manner. If the amount to be removed during the finish-machining step determined by the two-flank rolling test is within the preset tolerance values, the presently adjusted rate of advancement for the grinding tool may be maintained, and this may be indicated, for example, by a green light-emitting diode. For example, a yellow light-emitting diode should be switched on when the amount to be removed determined by the two-flank rolling test is within a given percentage above the permissible tolerance value and a reduction of the rate of advancement is necessary. If the determined amount of material to be removed surpasses the set limit, this may be indicated, for example, via a red light-emitting diode, thus indicating that toothed wheels are being machined which have defects resulting from the premachining steps.

DESCRIPTION OF PREFERRED EMBODIMENTS

The present invention will now be described in detail with the aid of the specific embodiment represented in the only Figure.

The Figure shows a front view of a workpiece W in the form of helical spur gear. The helical spur gear W is machined by a grinding tool WZ that is mounted on a grinding spindle SP. The grinding spindle SP is supported at a spindle housing SG and drives the grinding tool WZ. For the machining process the spindle SP together with the tool WZ is pivoted to correspond to the angle of the toothing of the toothed wheel W and is engaged.

However, the drawing represents in schematical fashion the position in which the two-flank rolling test is performed. The master pinion MR engages the workpiece W. The master pinion MR is connected to the spindle housing SG; however, it is pressed against the workpiece W via a spring F in a radial direction to ensure form-locking during the two-flank rolling test.

When the workpiece W is driven (rotation R1) the master pinion MR performs a rotation R2. The rotation of the master pinion MR is registered by a measuring device for measuring an angle of rotation MROT. The translatory movement of the axis of the master pinion MR which is in the plane of the drawing and vertical to the axis of the workpiece W is measured by a measuring device MTRA for measuring translatory movement Deviations of the ideal tooth geometry before the grinding especially deviations of the amount of material to be removed, result in differences $\Delta R$ and $\Delta T$ that are registered by the two measuring devices MROT and MTRA. The analysis of the time dependency of these two differences $\Delta R$ and $\Delta T$ provides the effective maximum amount of material to be removed during the grinding process by the tool WZ. The division of the maximum value of the effective maximum amount of material to be removed by the permissible amount of material to be removed per time unit yields the permissible value for the rate of advancement of the grinding tool WZ which is then fed into the machine control unit.

The present invention is, of course, in no way restricted to the specific disclosure of the specification and drawings, but also encompasses any modifications within the scope of the appended claims.

WHAT WE CLAIM IS:

1. A method for preventing thermal damage of workpieces during grinding comprising the steps of:
   before grinding, performing a two-flank rolling test with a master pinion;
   calculating an effective maximum amount of material to be removed during grinding from results obtained during said two-flank rolling test step;
   determining a permissible rate for advancing a grinding tool, based on a respective permissible volume of material to be removed per time unit and said effective maximum amount of material to be removed; and
   feeding said permissible rate for advancing a grinding tool to a grinding machine control unit.

2. A method according to claim 1, further comprising the steps of:
   roughing;
   finish-machining;
   wherein said two-flank rolling test step is performed after said roughing step and before said finish-machining step, and wherein in said calculating step a respective effective amount to be removed during said finish-machining step is calculated and, if said respective effective amount to be removed exceeds a preset limit, said rate for advancing a grinding tool is reduced.

3. A device for preventing thermal damage of workpieces during grinding by determining an effective maximum amount of material to be removed during grinding, determining a permissible rate for advancing a grinding tool, and feeding the permissible rate into a grinding machine control, said device comprising:
   a master pinion for performing a two-flank rolling test;
   a rotatory measuring means, connected to said master pinion, for measuring rotatory deviations;
   a translatory measuring means, connected to said master pinion, for measuring translatory deviations, whereby rotatory and translatory deviations are used to determine an effective maximum amount of material to be removed during grinding.

4. A device according to claim 3, further comprising light-emitting diodes for visually indicating respective effective amounts to be removed.

* * * * *